(12) United States Patent
Reents

(10) Patent No.: US 6,997,502 B1
(45) Date of Patent: Feb. 14, 2006

(54) CONVERTIBLE HARD CAP

(76) Inventor: Mark William Reents, P.O. Box 794, Waycross, GA (US) 31502

( * ) Notice: Subject to any disclaimer, the term of this patent is extended or adjusted under 35 U.S.C. 154(b) by 0 days.

(21) Appl. No.: 10/735,471

(22) Filed: Dec. 12, 2003

Related U.S. Application Data

(60) Provisional application No. 60/436,921, filed on Dec. 27, 2002.

(51) Int. Cl.
  *B60P 7/02* (2006.01)
(52) U.S. Cl. .............................. 296/100.03; 296/100.05
(58) Field of Classification Search ........... 296/100.03, 296/100.04, 100.05, 165
  See application file for complete search history.

(56) References Cited

U.S. PATENT DOCUMENTS

| | | | | |
|---|---|---|---|---|
| 2,853,340 A | * | 9/1958 | Hershberger | ................. 296/168 |
| 3,165,352 A | * | 1/1965 | Hallock et al. | ......... 296/100.04 |
| 4,289,346 A | * | 9/1981 | Bourgeois | .................... 296/105 |
| 4,659,136 A | * | 4/1987 | Martin et al. | ........... 296/100.04 |
| 4,784,429 A | * | 11/1988 | Hodges | ....................... 296/165 |
| 5,018,777 A | | 5/1991 | Swenson et al. | |
| 5,203,603 A | * | 4/1993 | Hertzberg et al. | ...... 296/100.03 |
| 5,368,396 A | * | 11/1994 | Cantrell | ........................ 384/58 |
| 5,516,182 A | * | 5/1996 | Aragon et al. | .......... 296/100.05 |
| 6,042,173 A | | 3/2000 | Nett | |

* cited by examiner

*Primary Examiner*—Joseph D. Pape

(57) ABSTRACT

A rigid convertible hard cap for open bed vehicles (18) made of rigid material and of the type having an arched shape of individual sections (24, 26 and 28) with fixed or movable sides and top or roof that communicate at the base and top with tracks (32 and 34) to guide and facilitate movement of cap sections (24, 26 and 28). Cap sections (24, 26 and 28) contract and extend integrally in an successive overlapping manner to obtain the desired effect of the complete or partial open and enclosed truck bed (18) without having to partially or completely obstruct truck bed space.

3 Claims, 13 Drawing Sheets

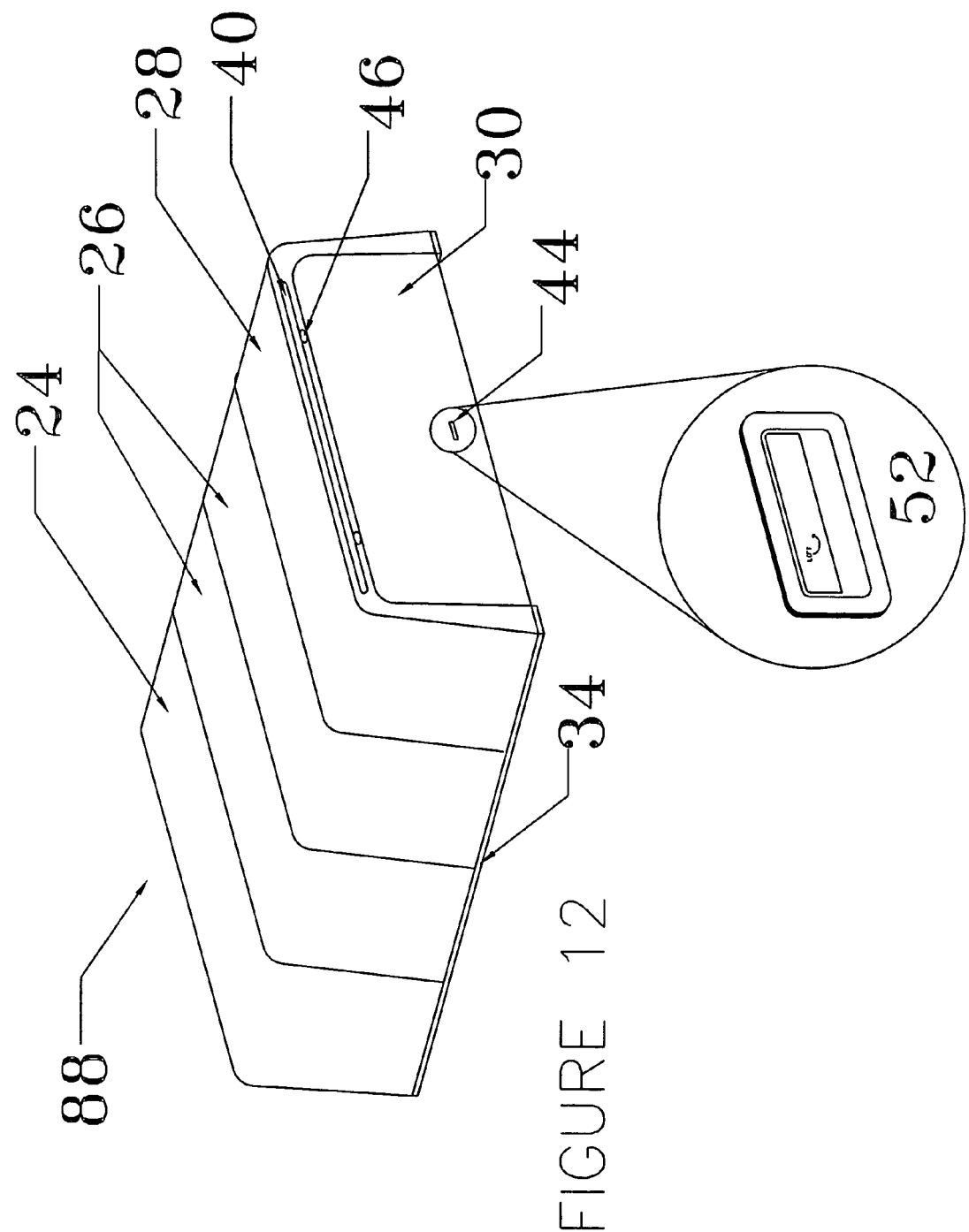

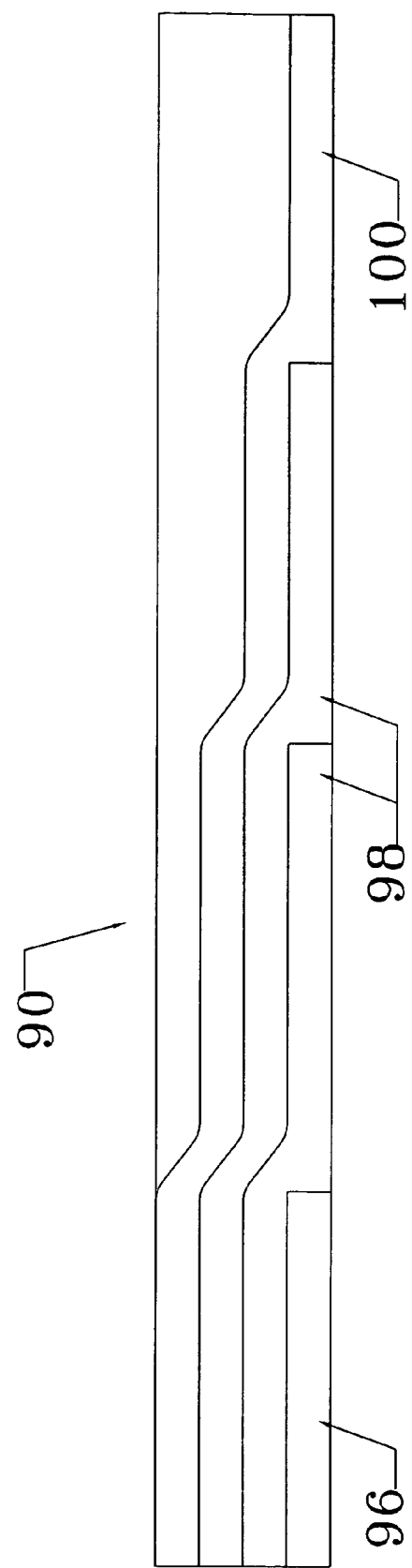

CONVERTIBLE HARD CAP

CROSS-REFERENCE TO RELATED APPLICATIONS

This application claim the benefit of PPA Application No. 60/436,921, filed Dec. 27, 2002.

SEQUENCE LISTING

None.

BACKGROUND

The invention relates to pick-up truck bed or open bed vehicle caps or cover specifically to a retractable or convertible rigid cap. Pick-up truck bed covers have evolved from tarps (soft cover) to the modern version of today's fixed position rigid or hard truck bed covers. Modern hard caps are made from rigid materials such as fiberglass, metal, aluminum, etc. that is formed to produce a fixed and predetermined size and shape. Hard covers also provide the benefits of rigid material such as longevity, protection and security. Tonneau covers as shown in U.S. Pat. No. 6,042,173 James A. Nett (2000) as seen FIG. 2 are made from rigid material and offer limited truck bed convertibility. The tonneau's ability to cover the truck bed is limited to the height of the truck bed rails thus limiting vertical height and greater square foot coverage.

Hard caps are fixed features that rise above the bed rails to provided greater square foot coverage. In order to have the truck bed covered the hard cap must be attached onto the bed rails of the truck. The opposite is true to expose or open the truck bed to the elements the cap must be totally removed and placed aside. The modern hard cap available today is a fixed object which is either on or off of the truck bed in order to obtain the desired effect of an enclosed or open bed which is a great inconvenience for the user. To try and solve this problem as seen in hinged cap invention U.S. Pat. No. 5,018,777 Cleo S. Swenson, Robert D. Grove and Clinton E. Grove (1990), as seen in FIG. 1 offers the user the ability to raise one side of the cap vertically from the truck bed rail. This hinged cap offers multiple access to the truck bed but still does not offer true convertibility to a complete or partial covered bed without removing the cap from the truck itself. To provide true truck bed convertibility a device would need to provide the desired open or enclosed truck bed space without compromising available or usable truck bed and bed floor space with the parts or function of the device.

The collapsible enclosure as seen in U.S. Pat. No. 4,659,136 John W. Martin and Judith T. Martin (1986) provides a partial truck bed cover however it is at the cost of available or usable truck bed space. As seen in FIG. 2 during full cap contraction the gate frame and door obstruct and severally limit the full or complete usable truck bed and bed floor space unless the gate frame and door are removed and placed aside. As seen in FIG. 9 the bed floor may be accessible by the opening of the door however the door would unrealistically need to remain in open position while traveling in order for full bed usage when the apparatus is in the complete contracted position. Furthermore the gate frame assembly must be removed and adjusted each time the apparatus is moved to a fixed or partial covering of the bed. The gate frame assembly as seen in FIG. 9, FIG. 10 and FIG. 12 in itself does not permit normal and full bed usage at any position and would have to be totally removed for full and normal bed usage thus deleting its purpose. As seen in FIG. 1 there is also no provision for adjusting vertical height, the side wall of the cap are fixed and therefore cannot rise vertically to provide additional variable vertical space.

Furthermore the layered affect caused by the ability to extend and collapse or contract causes each successive portion of the cap to be smaller in dimension than the former section as seen in FIG. 1. There is no embodiment or provision for a smooth outer surface and thus providing an equal interior covering dimension for each extending cap section.

The track as seen in FIG. 5 for which this particular apparatus moves on the bed rails is complicated and dependent on a cable for manual movement. The tracks are not simply a guide to shuttle the apparatus to a collapsible or extended position instead the tracks are a complicated propulsion and motion system.

A further limitation for this apparatus is that the nearest section to the truck cab is fixed and unable to have the ability to freely extend and contract as the other following sections and this also does not provide the user to reverse the extension and contraction process to be from rear to front of the truck bed, should the user prefer. Also this apparatus has no provision for vehicle accessories that are common and needed on trucks such as truck bed tool boxes and roof racks. In conclusion this invention only provides manual operation and the restrictions of the apparatus described above complicate and only provide at best partial bed use unless portions are totally removed and there is no provision or embodiment for side walls to extend and contract vertically thus providing adjustable vertical height. Furthermore there are no provisions or embodiments that offer equal interior dimensions or smooth exterior surface because of the extending and contracting nature of the apparatus.

Other inventors have tried to be less complicated and provide the versatility of converting the truck bed to be open or enclosed without having to totally remove the cover from the truck bed. Inventions such as retractable soft covers are available as seen in U.S. Pat. No. 5,758,921 Elizabeth R. Hal (1998) FIG. 2. However soft covers are inferior to rigid material because it does not offer adequate protection, security or longevity, etc. but it does offer the ability to cover the truck bed above the height of the bed rails.

In conclusion, insofar as I am aware, no rigid cap extending above the bed rails formerly developed provide the ability to manually or through power means convert the truck bed from partially or completely open to partially or completely enclosed without the defect of having to partially or totally remove the cap from the truck bed and without compromising or obstructing available and usable truck bed and bed floor space, there are also no provisions for adjustable vertical height.

SUMMARY

The invention, an improved rigid convertible hard cap, comprises of movable arched rigid sections of the type that have fixed and adjustable sides and a roof that rise above the bed rails. The rigid cap sections move respectively along independent tracks or guides to partially or completely convert the truck bed to open and covered or enclosed without removing the cap sections or cap from the truck bed.

Accordingly, several objects and advantages of my invention are to: provide an improved rigid hard cap, to provide true convertible rigid truck bed coverage without compromising available or usable truck bed space, provide greater versatility and freedom of truck bed coverage, provide adjustable vertical space coverage, provide ability for accessory use, provide a manual and power versions, provide a smooth overall outer appearance and even dimension interior, to provide a more user-friendly, yet economical bed coverage. Still further objects and advantages will become apparent from a study of the following description and the accompanying drawings.

DRAWINGS

FIG. 12 is a perspective left-side view of the smooth embodiment apart form truck bed.

FIG. 13 is a top view of the advanced track only.

Figure 1:
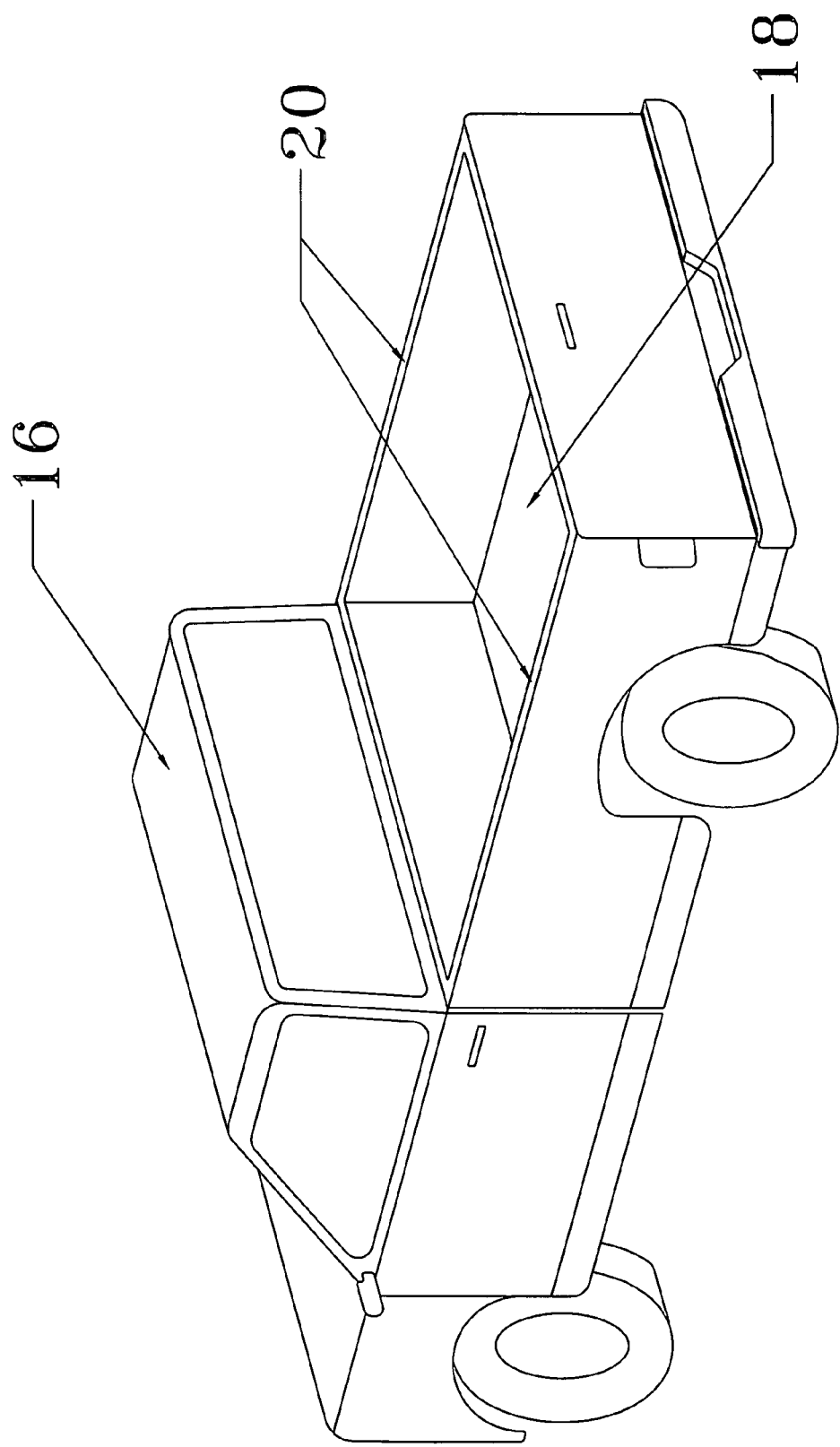
FIG. 1 is a perspective left side view of a pick-up truck with an open truck bed.

DRAWINGS—REFERENCE NUMERALS 16. truck cab
18. truck bed
20. bed rails
22. convertible hard cap
24. housing section
26. mid sections
28. end section
30. cap door
32. top track
34. base track
36. ball guide
38. lock hole
40. door shelf
42. door magnet
44. door handle
46. door hinge
48. door pivot
50. door ball guide
52. cap handle
54. weather seal
56. inner flange
58. outer flange
60. housing lock pin
62. groove
64. power track
66. bearing extension
68. electric mini-winch
70. winch cable
72. recoil spring
74. convertible upper side
76. lower side
78. scissor jack
80. upper vertical track
82. lower vertical track
84. accessory base track
86. angled cap section base
88. smooth embodiment
90. advanced base track
92. depressed cap groove
94. top cap seal
96. housing section groove
98. mid-section groove
100. end section groove
102. tool box
104. front wall
106. front wall window

DETAILED DESCRIPTION

Figure 2:
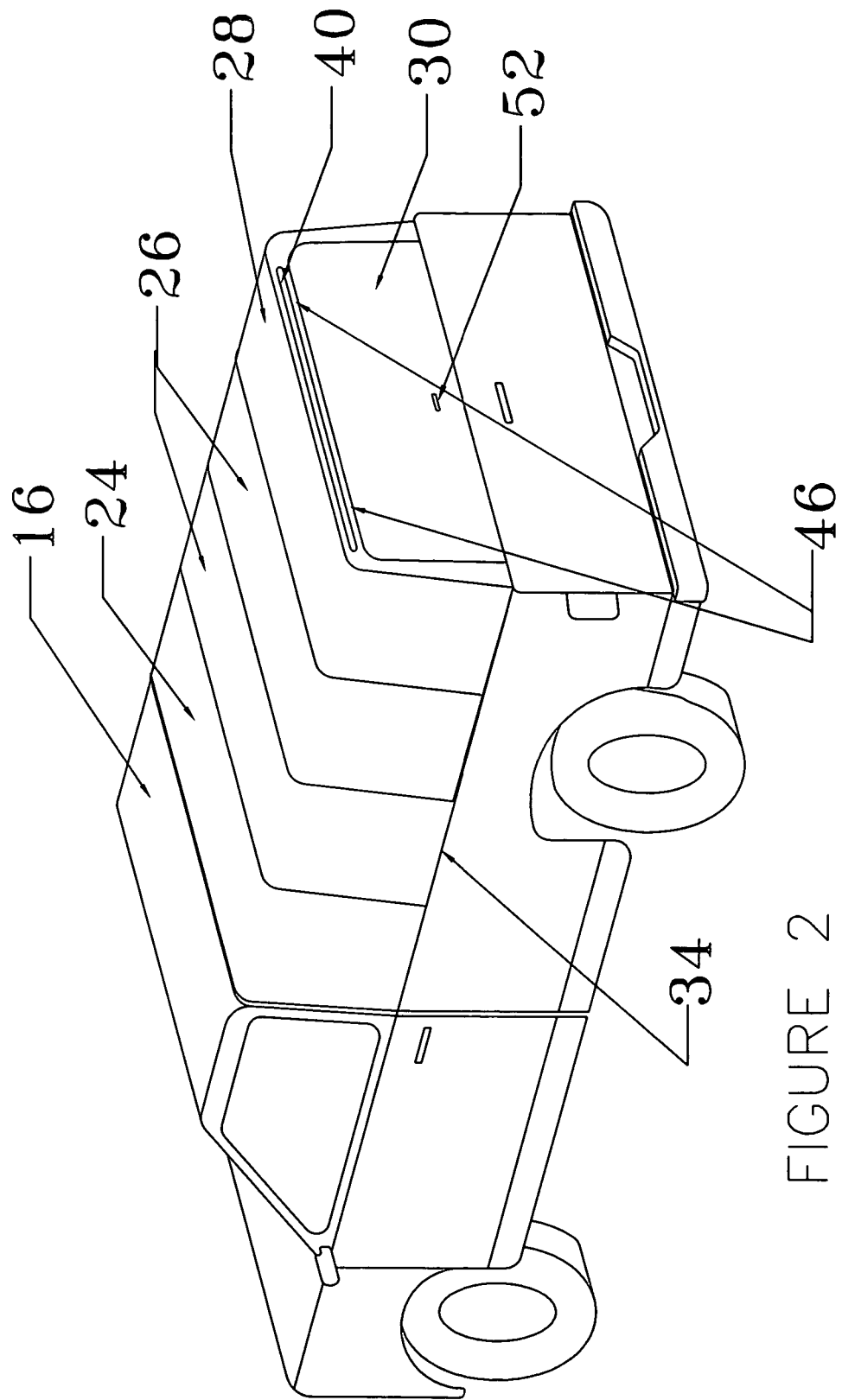
FIG. 2 is a perspective left-side view of the pick-up truck with the basic convertible hard cap fully extended to enclose the truck bed.

A basic embodiment of the present invention is illustrated in FIGS. 1–7. FIG. 2 shows a perspective left-side view of the convertible hard cap 22 completely extended to enclose the truck bed 18. The housing section 24, mid sections 26, and end section 28 are individually formed into arch shapes following the contour of the truck cab 16 and made of enough layers of fiberglass for sufficient rigidity. Each cap section 24, 26 and 28 has two flat aluminum reinforcement bars 12.7000 millimeters thick and 50.8000 millimeters wide that run between fiberglass layers on the inner edges from one cap section base to the other (not shown). Cap sections 24, 26 and 28 rise vertically starting 0.5 cm above the top of the base track 34 and rise upward to the height of the truck cab 16 and join horizontally at the height of the bed cab 16. Each cap section 24, 26 and 28 is one unit with two side walls and a top or roof. The width of the cap sections 24, 26 and 28 are contained to the width of the base track 34 that is connected to the bed rails 20. The length from the front and back or distal and proximal edges of each section 24, 26 and 28 will depend on the size of the truck bed 18. For example a truck bed 18 of 1.8 meters in length will have four sections 0.60960 meters in length. Cap sections 24, 26 and 28 quantity varies depending on design. The other cap sections 26 and 28 will not be larger in dimension than the housing section 24. The dimensions of the housing section 24 is the largest section followed by a smaller in width and height mid sections 26 followed by the smaller in width and height end section 28. FIGS. 1–7 shows that the cap sections 24, 26, and 28 are imbricate to give the convertible cap the ability to contract and extend in overlapping relation. The front or proximal end of the housing section 24 has a front wall 104 with a centered window of rigid transparent material such as Plexiglas or glass that together completely enclose the front of the housing section 24 from the top of the housing section 24 to the bed rail 20 height. The end section rear end or distal end is formed to facilitate the cap door 30. The three ball guides 36 located at the front, mid and end bottom or base of each section on each side gives the cap sections 24, 26 and 28 the ability to move. The cap handle 52 is made of aluminum and is located under the door shelf.

Figure 6:
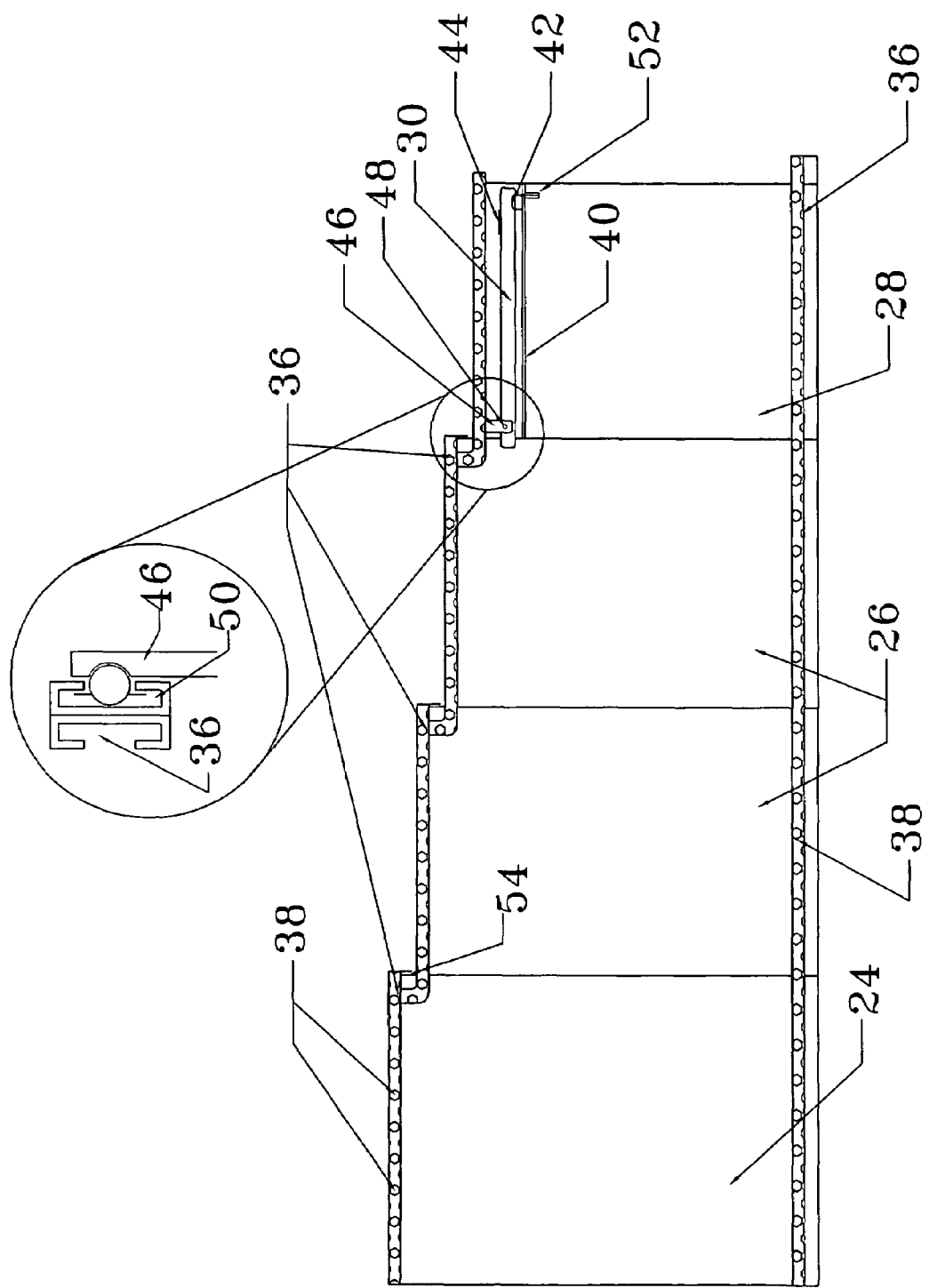
FIG. 6 is a cross sectional left-side view of the convertible hard cap and base in the complete open or extended position.
Figure 7:
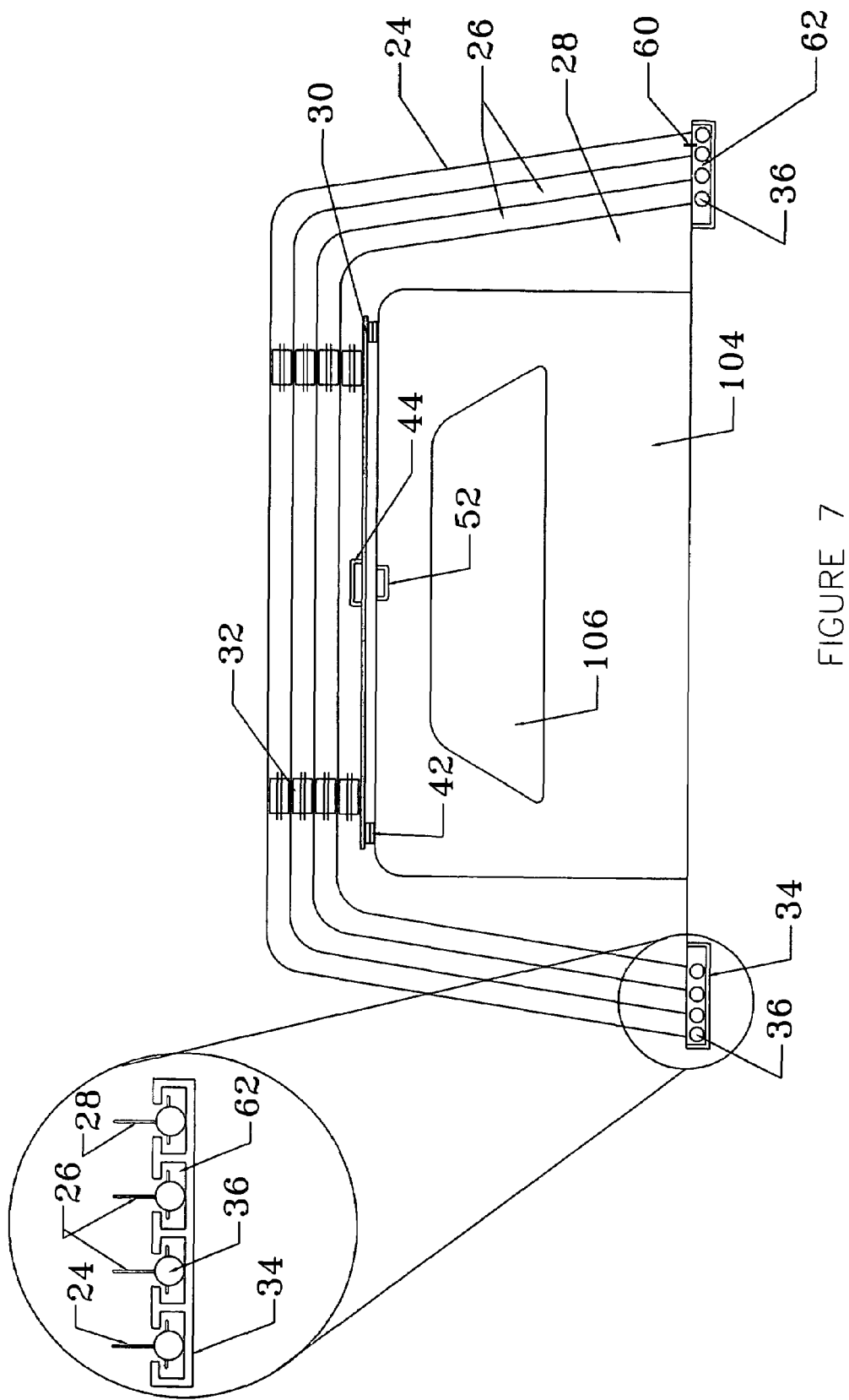
FIG. 7 is a rear view of the convertible hard cap and track of FIG. 5 without the weather seal, inner and outer flanges.

The top tracks 32 are the guides to facilitate proper cap sections 24, 26 and 28 alignment and shuttle movement for the upper portion of the cap sections 24, 26 and 28. The top track 32 and base track 34 are made from rigid material such as aluminum or metal. There are two top tracks 32 that are connected to each cap section's 24, 26 and 28 inner roof or top and are parallel to each other approximately 0.91440 meters apart from cap section mid line. As seen in FIG. 6 the cross sectional left-side view and FIG. 7 the rear view of the convertible hard cap 22 at the proximal or front end of the top tracks 32 on the mid sections 26 and end section 28 are ball guides 36 made of steel and of sphere shape and size like that of a round toy marble. The ball guides 36 are attached to the proximal ends of the top track 32 which is at the proximal end or front end of cap sections 26 and 28 and are large enough to ride and be contained in the top tracks 32 of the preceding cap sections 24, 26 and 28. Throughout the length of the top tracks 32 are a plurality of lock holes 38 approximately one ball guide 36 width apart. The lock holes 38 are smaller than the ball guides 36 creating a place of interaction along the track where the ball guide 36 when aligned into the lock hole 38 creates a point of tension, locking and alignment. As seen in FIG. 7 the top track 32 shape is designed to facilitate the ball guides 36 of the proceeding section which run on both sides of the top track 32. The two top tracks 32 are parallel with each other and are the length of each section 24, 26 and 28 and are only wide and deep enough for the ball guide 36 to provide the minimum dimension difference in successive cap sections 24, 26 and 28 so that overlapping may take place with minimum clearance between cap sections 24, 26 and 28 to facilitate the greatest amount of overall covered square footage and smooth appearance.

The base tracks 34 run the length and width of the bed rails 20. The base track 34 has a plurality of individual grooves 62 for each cap section 24, 26 and 28 (FIG. 7) that run the length of the track 34 to facilitate the ball guides 36 that are attached at the base of cap sections 24, 26 and 28. Like the top tracks 32 a plurality of lock holes 38 run the length of the base track 34 within each groove 62 and act as a place of locking, tension or alignment as described for the top tracks 34. The top track 32 and base track 34 locking holes 38 are aligned so that proper vertical and horizontal alignment can be maintained for cap sections 24, 26 and 28. All ball locks 38 are made from rigid material such as aluminum or steel and are approximately the size of a round toy marble. The lock hole 38 runs along the inner vertical and bottom or base portion of the base track 34 groove 62 that facilitates the ball guides 36 attached to each cap section base 24, 26 and 28. There are three ball guides 36 on each side at the base of each cap section 24, 26 and 28. The whole tracking system comprises of ball guides 36, lock holes 38 and tracks 32 and 34 that interact integrally to function in unison.

Figure 3:
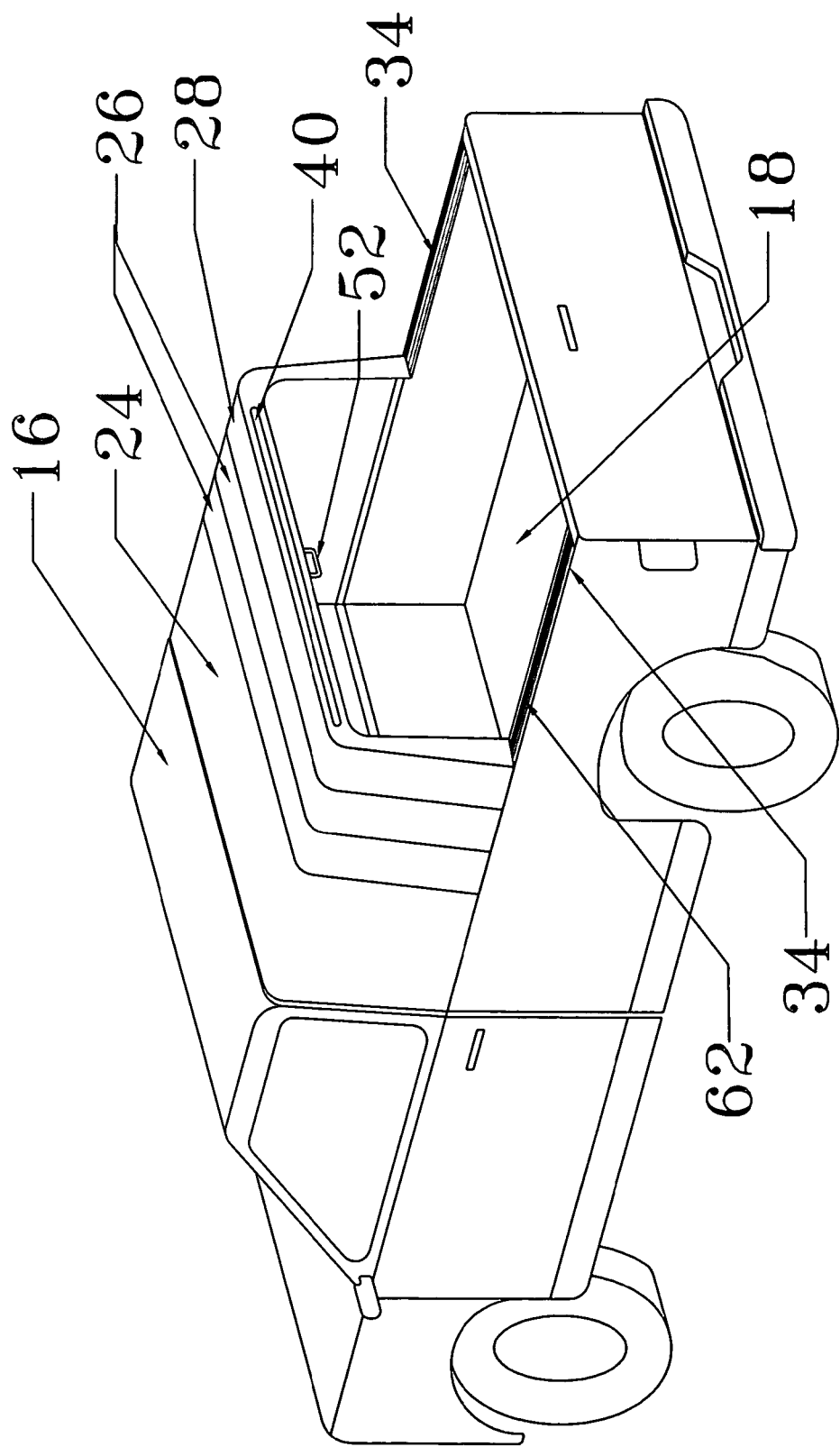
FIG. 3 is a perspective left-side view of the pick-up truck with the convertible hard cap sections contracting into the housing section to convert the once enclosed truck bed to an open bed.
Figure 4:
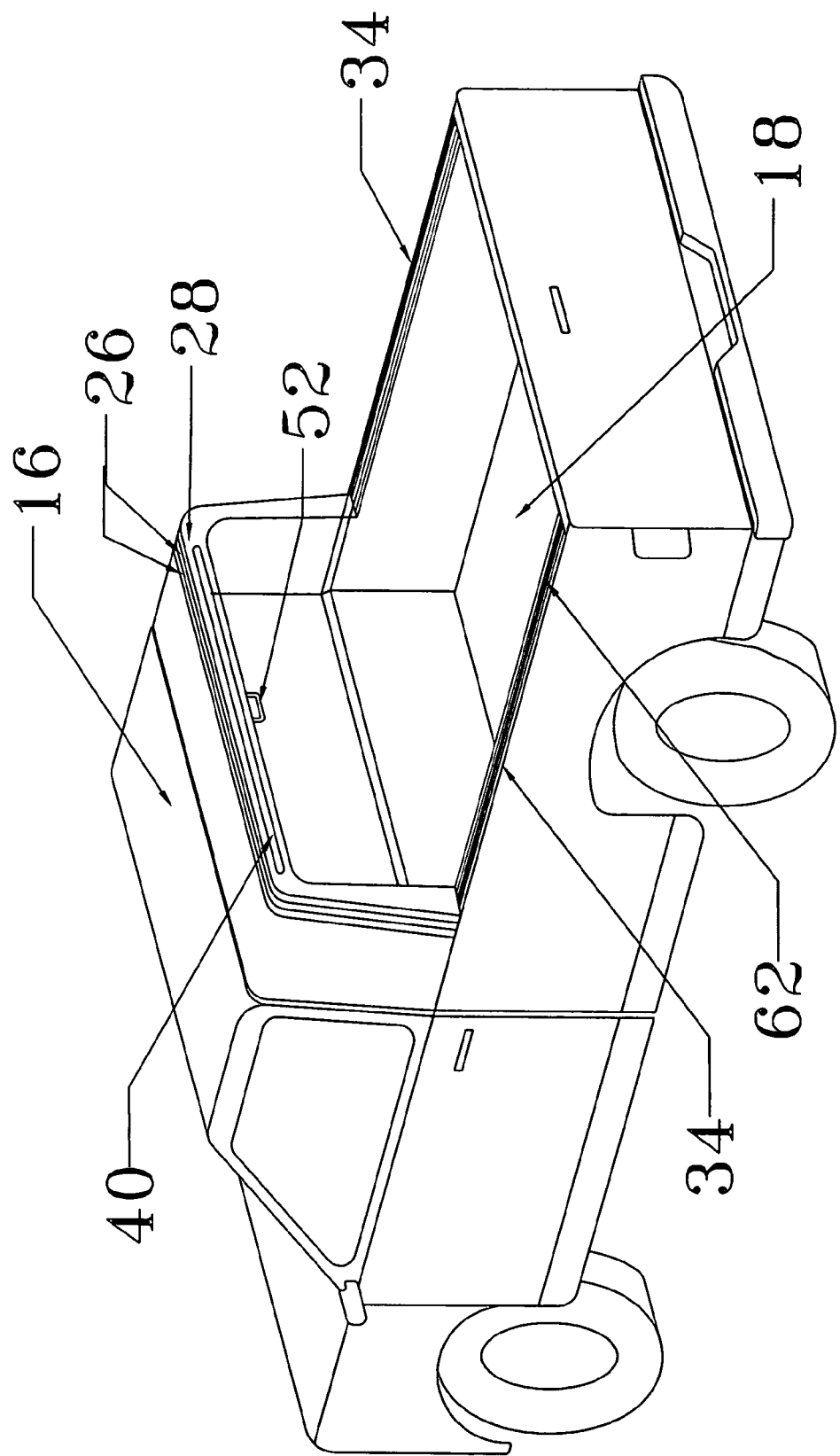
FIG. 4 is a perspective left-side view of the truck with the convertible hard cap in the complete closed or contracted position protected with each cap section encompassed by the housing section.

FIG. 7 shows a rear view of the convertible cap 4 with the housing lock pins 60 which are made of metal, steel, or aluminum and is located on both sides of the housing section base 5. The housing lock pin 60 protrudes through a hole at the base of the housing section 24 and continues through another hole at the top of the base track 34. The lock pin holes (not shown) are at predetermined locations throughout the length of the base track 34 to keep the housing section 24 fixed or anchored at the preferred location near the truck cab 16 as seen in FIG. 3 or at any other desired location along the base track 34.

Figure 5:
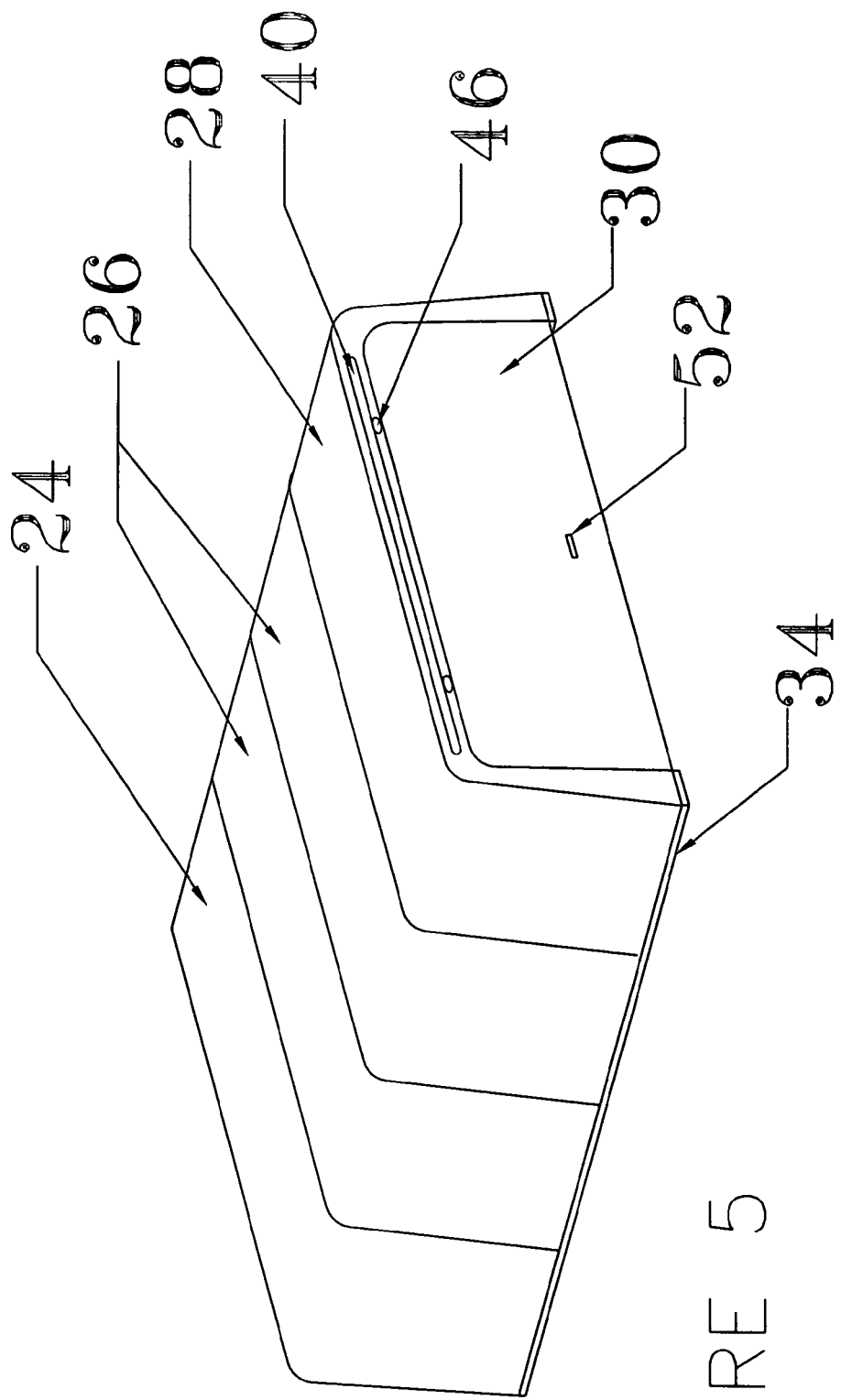
FIG. 5 is a perspective left-side view of the convertible hard cap in the complete open or extended position track apart from the pick-up truck.

FIG. 6 the cross sectional left-side view and FIG. 7 rear view show the cap door 30 in the open or dormant position. The cap door 30 is made of transparent material such as Plexiglas or glass and is located at the inner top distal or rear portion of the end section 28. The cap door 30 has two door hinges 46 that are attached at the top of the cap door 30. The door hinge 46 is attached to the cap door 30 and has door pivots 48 which allow the door to pivot from its horizontal position to the closed or vertical position as seen in FIG. 5 the perspective left-side view of the hard cap apart from the truck bed. The door hinges 46 are mounted on the top sides of the cap door 30 and are as wide as the top track 32 that is connected to the end section 28. Attached to each door hinge 46 at the opposite end of the door pivot 48 is the door ball guide 50 that is guided by the top track 32. The door shelf 40 is attached to the inner roof of the end section 28 and extends downward and joins together horizontally creating a protected and secure resting area for the cap door 30. Attached to center outer bottom of the door shelf 40 is the cap handle 52 made of aluminum. There are two door magnets 42 attached at the inside base of the cap door 30 and attached to the inner rear edge of the door shelf 40 as seen in FIG. 6 cross sectional left-side view and FIG. 7 rear view. The door magnets 42 are at the inner base of the cap door 30 and at the base of the door shelf 40. The door handle 44 is a flat and hinged made from metal and located in the outer center bottom of the cap door 30. The door handle 44 is hinged to remain in a flat position to accommodate a flat or smooth appearance as seen in FIG. 12 exploded view. When the cap door 30 is in the open position it runs horizontal and parallel with cap sections 24, 26 and 28 roof. In the open position the cap door 30 is held in place by the locking or tension interaction caused by the door ball guides 50 and the lock holes 38 located throughout the length of the end section's 28 top tracks 32 and by the door magnets 42. The end section 28 top track's 32 lock holes 38 are used only for the cap door's 30 door ball guides 50.

The outer rear end or distal end of the end cap 28 extends inward toward the center of the truck bed 18, perpendicular and horizontal to the top of the base track 34 and is designed to facilitate the cap door 30 as seen in perspective left-side view FIG. 5 and FIG. 7 rear view.

Additional Embodiments

Figure 8:
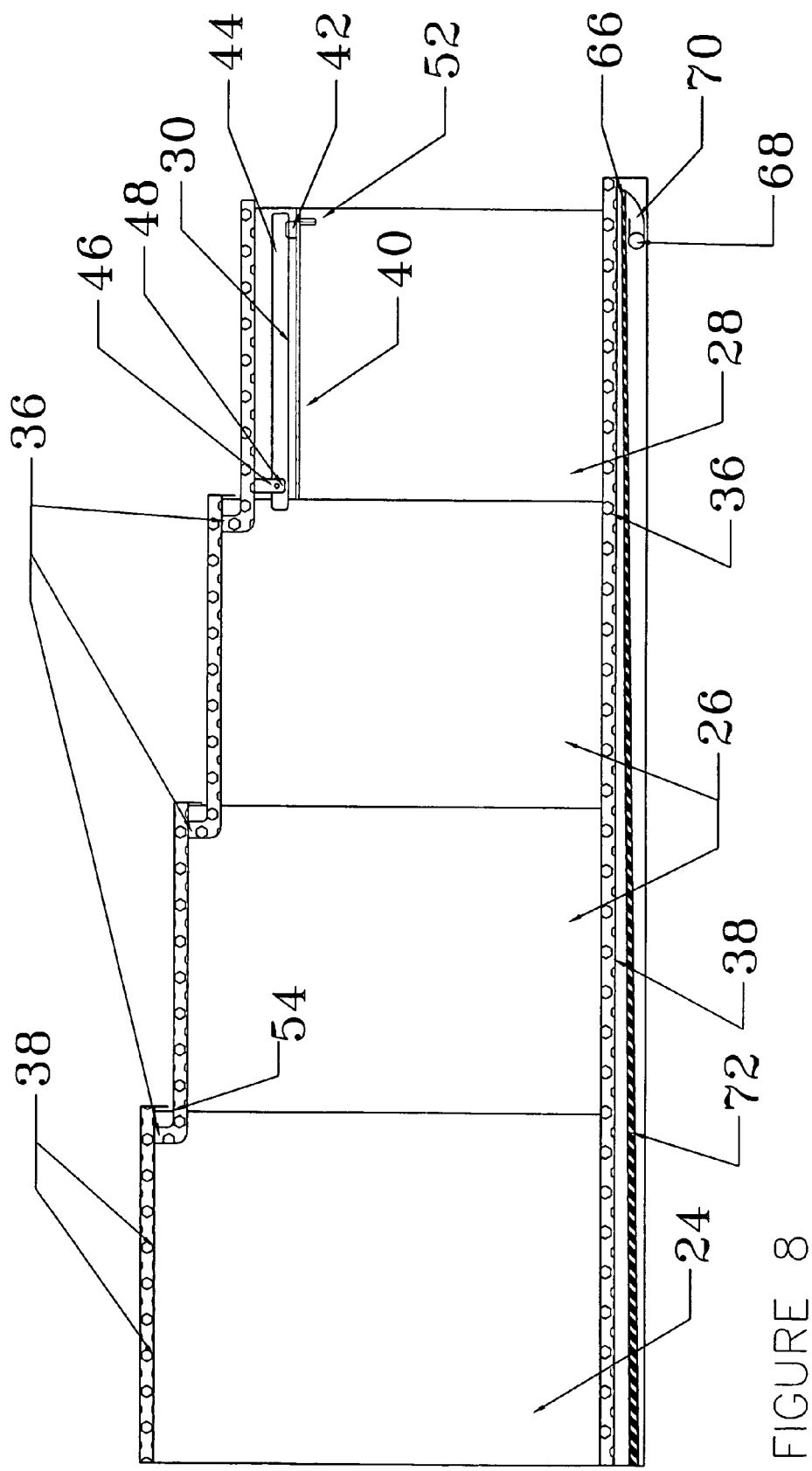
FIG. 8 is a cross sectional left-side view of the preferred basic powered embodiment of the convertible hard cap apart from the truck bed.

Powered Convertible Hard Cap. FIG. 8 shows a left cut view of the powered convertible cap apart from the truck bed. The powered version herein described is identical to the basic version in description and operation except for the power track 64, bearing extension 66, electric mini-winch 68, winch cable 70 and recoil spring 72. The two electric mini-winches 68 are attached to each power track 64 near the rear and under the second level of the power track 64. The electric mini-winches 68 are connected to the vehicle or alternate power source not shown. The winch cable 70 runs from the electric mini-winch 68 and is attached to the bearing extension 66 that extends from the bottom of the distal ball guide 36 on the end section 28 bases through the top and into the bottom of the power track 64. When activated the electric mini-winches 68 pull the end section 28 from its contracted position within the housing section 24. As the end section 28 moves it will be guided by the power tracks 64 and top tracks 32. The mid sections 26 will follow the end section 28 in successive order when the top tracks 32 reach their limit of extension. The recoil springs 72 are located on the third level of both power tracks 64 and is attached to the front inner portion of the power tracks 64 and to the same bearing extensions 66 that the winch cables 70 are attached. To contract or close the convertible hard cap 22 the electric mini-winches 68 will reverse causing slack to the winch cable 70 to cause the end section 28 to be pulled toward the truck cab 16 or the front or proximal end of the power tracks 64 by the recoil of the recoil springs 72 thus causing the mid sections 26 to follow.

Figure 9:
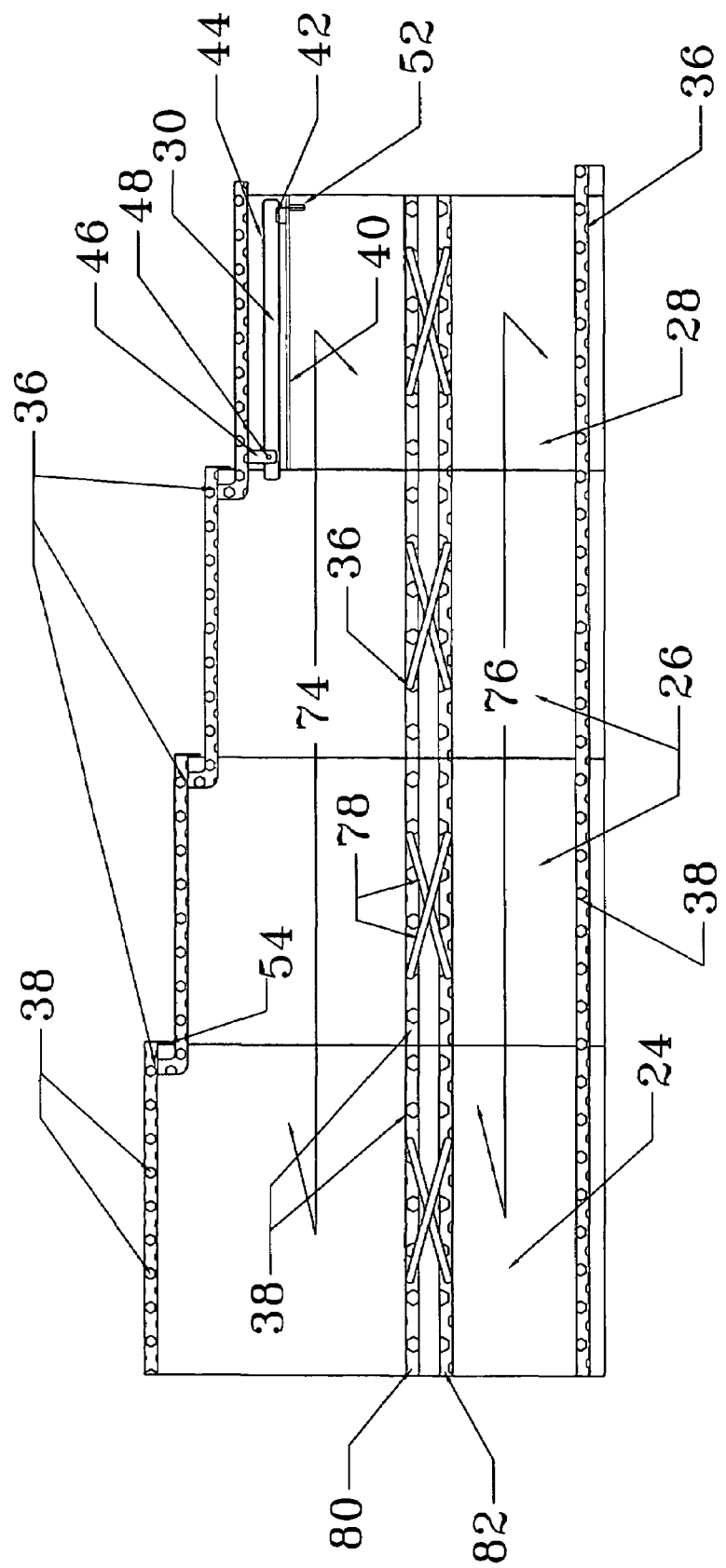
FIG. 9 is cross sectional left-side view of the advanced convertible hard cap apart from the truck bed.

The Advanced Vertical Cap. FIG. 9 shows a cross sectional left-side view of the advanced vertical cap. This particular embodiment converts to provide additional vertical covered truck bed 18 vertical space by the addition of the convertible sides on the cap sections 24, 26 and 28 that extend and contract. The advanced vertical cap is identical in description and operation as the basic and/or power embodiment except for the scissor jacks 78, vertical tracks 80 and 82, upper and lower sides 74 and 76. One scissor jack 78 is located on each inner side of each cap section 24, 26 and 28. The scissor jacks 78 ends have ball guides 36 and the upper vertical tracks 80 and lower vertical tracks 82 have lock holes 38 that run the length of the track. The ball guides 36 and lock holes 38 interact identically as in the description and operation of the basic preferred embodiment. The ball guides 36 located on the two lower ends of the scissor jacks 78 run along the lower vertical track 82 that is attached to the inner lower side 76. The lower side section 76 acts as an anchored base for the convertible upper side that rises and lowers according to the movement of the scissor jack 78 located on each side of each cap section 24, 26 and 28. When the scissor jacks 78 extend the convertible upper side 74 rises while the lower side 76 does not move. The extended or contracted position of the scissor jack 78 that interacts with the upper and lower vertical tracks 80 and 82 determines the extent of movement of the convertible upper side 74. The ball guides 36 are located on all four ends of the scissor jack 78 and the top ball guides 36 run along the upper vertical track 80 attached to the inner convertible upper side 74. Each cap section 24, 26 and 28 has an independent scissor jack 78, upper vertical track 80 and lower vertical track 82 that work in unison when force is applied by powered or manual means.

Figure 10:
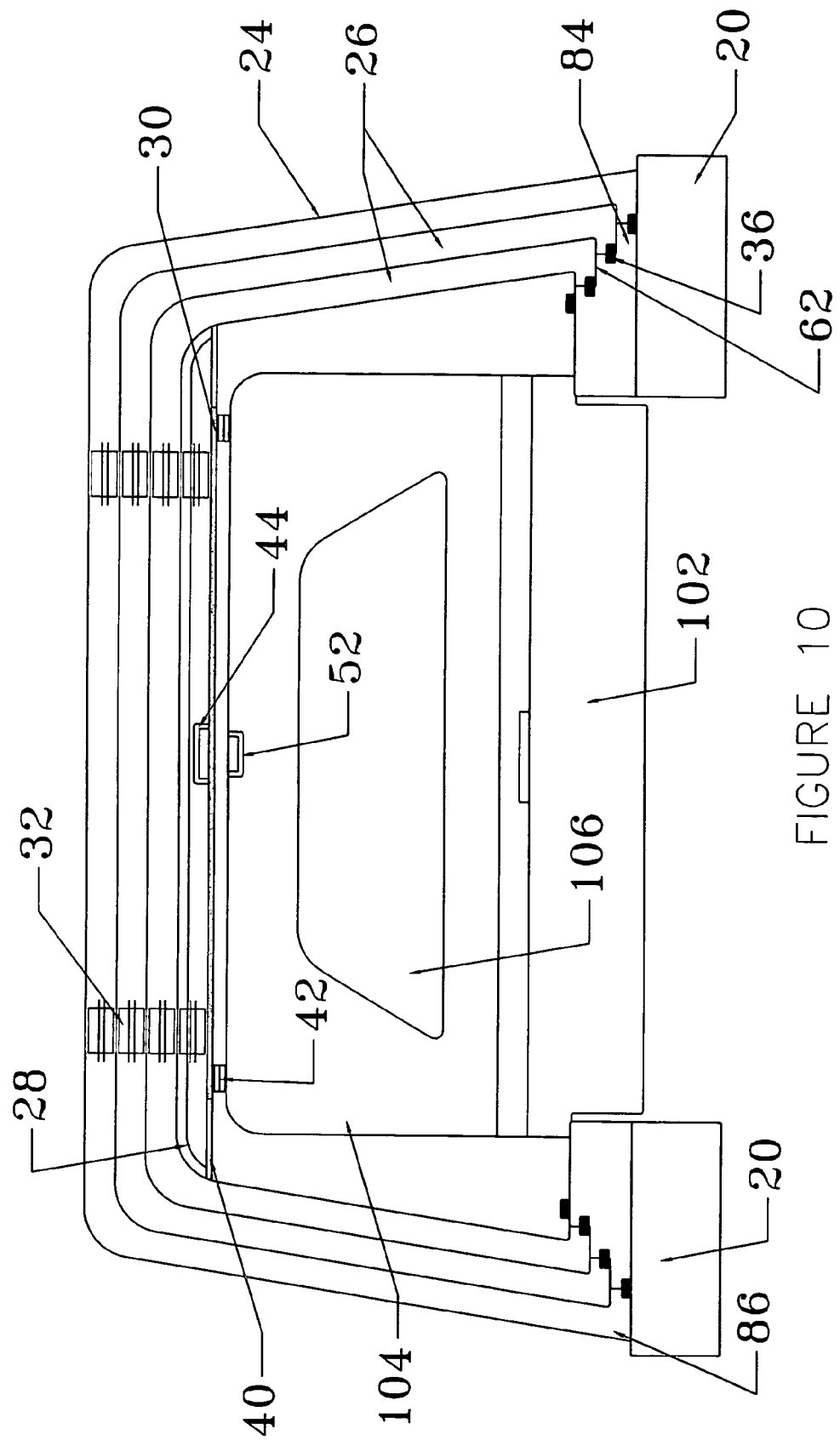
FIG. 10 is a rear view of the convertible hard cap accessory embodiment without the weather seal, inner and outer flanges apart from the truck bed.

Accessory Embodiment. FIG. 10 rear view of convertible hard cap accessory embodiment apart from a truck bed that shows the accessory base track 84 with the track grooves 62 facing outward instead of upward as in the basic embodiment as seen in FIG. 9 the cross sectional left-side view. This is done to accommodate a tool box 102 or other bed rail 20 accessories that would normally rest on the top of bed rails 20 of an open truck bed without any cover but when using the accessory embodiment the tool box 102 would then rest on the top of the accessory base track 84. This allows the accessory embodiment to function identical to the preferred basic embodiment 22. Each cap section 24, 26 and 28 angles inward where the ball guides 36 are attached and interact with the accessory base track 84 as in the basic preferred embodiment. The accessory base track 84 and the angled cap section base 86 is the only major difference. The accessory base track 84 has individual grooves 96, 98 and 100 for each cap section 24, 26 and 28 to facilitate movement.

Figure 11:
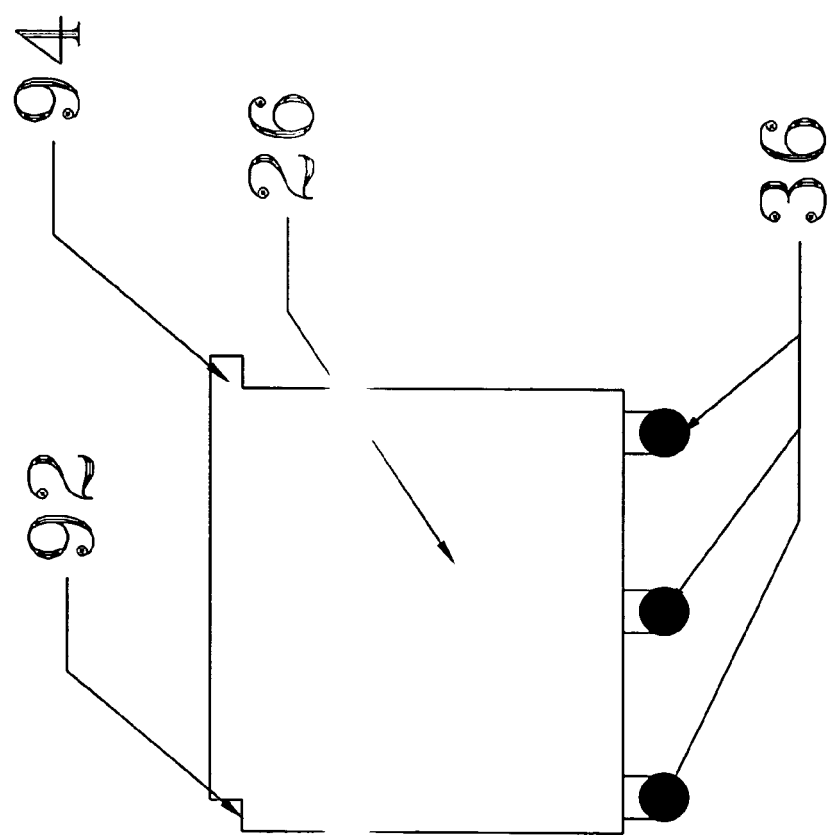
FIG. 11 is a left-side view of one cap mid-section without the advanced base.

Smooth Convertible Hard Cap. FIG. 12 shows the perspective left-side view, FIG. 13 show a top view of one advanced base track and FIG. 11 shows a perspective left-side view of the mid- section 26. The smooth embodiment's (FIG. 11) advanced base tracks 90 allow the cap sections 24, 26 and 28 to overlap when contracting and extending as described in the basic embodiment. The smooth convertible hard top embodiment's advanced base tracks 90 and top tracks 32 allow the cap sections 24, 26 and 28 to have a smooth outer surface when completely extended. In the basic embodiment when the cap sections 24, 26 and 28 are completely extended they remain in the overlapped position giving a stepping or overlapping appearance. In this smooth embodiment all of the cap sections 24, 26 and 28 are of the same dimensions. The advanced base tracks 90 has individual cap section grooves 96, 98 and 100 that rise and lower to direct the caps sections 24, 26 and 28 outward and inward to their positions in successive order. The advanced base track's 90 grooves 96, 98 and 100 direct the cap sections 24, 26 and 28 (that are of the same size) to successive lower and inner positions to be encompassed by the housing section 24 when in the competed contracted position. When the cap sections 26 and 28 begin to extend from the contracted position each cap section 26, and 28 will follow their individual base track groove's 98 and 100 which will rise to the level of the housing section's 24 outer most highest groove 96 thus aligning all the cap sections 24, 26 and 28. Mid sections 26 the proximal or front outer edge will be a depressed cap groove 92 and at the outer distal or rear outer edge will be a top cap seal 94. The housing section 24 will have the depressed cap groove 92 only at the distal or rear edge and the end section 28 will have the depressed cap groove 92 only at the proximal or front edge.

A rubber strip (not shown) will run the length and width of each depressed cap groove that acts as a weather seal when the cap sections 24, 26 and 28 are in the complete extended position. The depressed cap grooves 92 and the top cap seals 94 interact with the advanced base tracks 90 to facilitate a weather seal and to give the smooth appearance. The top tracks 32 where the ball guides 36 are located at the proximal or front end of each top track 32 will have the ability to hinge (not shown) so that track integrity 32 and 90 can be maintained and to allow the cap sections 26 and 28 to ride and: descend on the advanced base track 90. The interaction of the ball guides 36 and hole locks 38 will be identical as in the basic preferred embodiment in description and operation. The cap sections 26 and 28 will be of substantially rigid material that will have the ability to flex to facilitate the groove's 98 and 100 direction. All other aspects of smooth convertible hard cap embodiment not mentioned will be identical to the basic embodiment. The smooth convertible hard cap embodiment can incorporate the vertical rise aspects of the advance embodiment, the accessory track, and/or be a powered embodiment.

Alternate Embodiments

Other embodiments can be used effectively for commercial truck trailers, non-commercial trailers and for in-ground pool coverage providing the same versatility of the convertible hard cap. Other embodiments of the convertible hard cap 22 allow accessories to be incorporated and used in conjunction with the invention such as fog lights, tool boxes, roll bars, ladder racks, etc.

Operation

In operation the convertible hard cap 4, FIGS. 1–7 when completely opened or extended to enclose the truck bed 18 to the elements and when completely closed or contracted opens the truck bed 18 to the elements. The user when desired can partially or completely contract or extend the convertible hard cap 22 to provide a covered and open truck bed 18.

To manually open and extend the convertible hard cap 22 to cover the open truck bed 18 one would take hold of the cap handle 52 and pull with enough force to cause the cap sections 26 and 28 to begin to extend in succession with overlapping relation from the housing section's 24 stationary position (The housing section 24 is the largest and outer most section from which the cap section 26 and 28 contract and extend.) The cap sections 26 and 28 will be guided by the top tracks 32 and base tracks 34 to the desired open position. As the end section 28 moves it will be guided by the base tracks 34 and top tracks 32. The following mid sections 26 will follow the end section 28 in successive order when the top tracks 32 reach their limit of extension. The housing section 24 is locked in place by the housing lock pins 60 and will remain stationary or anchored as the other cap sections 26 and 28 move. Once the cap sections 26 and 28 have been partially or completely extended or contracted they will be held in place by the interaction of the lock holes 38 and the ball guides 36 located in the top tracks 32 and base tracks 34.

To close or contract the convertible hard cap 22 one would reverse the actions done to open or extend the convertible hard cap 22. A pushing force would be applied to the cap handle 52 with enough force to cause the cap sections 26 and 28 to move along the top tracks 32 and base tracks 34. To completely close or contract the cap sections 26 and 28 the closing process would continue until the cap sections 26 and 28 are completely stopped by the top tracks 32 and base tracks 34 end points thus the cap sections 26 and 28 will be completely encompassed under the housing section 24. To partially open or close the convertible hard cap 22 the above process may be stopped at any desired point and will be held in place by the top tracks 32 and base tracks 34.

The housing section 24 can also move from its stationary or fixed position when the housing lock pins 60 are removed giving the housing section 24 the freedom to move to any desire location along the base tracks 34. To secure the housing section 24 again simply place the housing lock pins 60 through the housing base hole (not shown) into the base track 34 hole (not shown).

The cap door 30 will be pulled from the open or dormant position at the door handle 44 (located at the outer side of the cap door base 30) that will cause the door magnets 42 to disengage. The cap door 30 will slide out from the door shelf 40 being guided by the end cap 28 top tracks 32. When the cap door's 30 door ball guides 50 reach the end of the end section's 28 top track 32 the cap door 30 will pivot to close the cap door 30 in the closed vertical position. The cap door 30 and rear end of the end section 28 will interact to enclose the once opened end of the end section 28. In the closed position the door handle 44 will have the ability to lock the cap door 30. To return and secure the cap door 30 within the door shelf 40 to the dormant or closed position one would, lift with an outward and upward motion at the base of the cap door 30 causing it to pivot on the door hinges 46 at the door pivots 48 then with upward and outward force lift the cap door 30 to the horizontal position and push on door handle 44 to cause enough force for the cap door 30 to be guided along the top tracks 32 of the end section 28 until the cap door 30 stops. Once the cap door 30 has stopped the door will rest onto the door shelf 40 and engage the door magnets 42.

CONCLUSION, RAMIFICATIONS AND SCOPE

Thus the reader will see that the convertible hard cap of this invention can be used to convert the truck bed to completely open or enclosed, can provide various partial truck bed cover options for the user, can alter truck bed coverage space with ease, can incorporate usage of accessories, can provide manual or powered versions, can provide convertible vertical truck bed space, can use embodiments in combination and can provide all the benefits of a rigid cover such as security, protection, longevity, etc.

While my above description contains much specificity, these should not be construed as limitations on the scope of one preferred embodiment thereof. Many other variations are possible. For example, the cap sections can have: other arrangements or placement and mode of function, various shapes, sizes and color, various rigid materials such as fiberglass, aluminum, metal, steel, etc., different forms of relational movement to facilitate extension and contraction such as overlapping, under lapping, sandwiching, etc. different forms of relational movement, windows or transparent or translucent material in various locations for various functions, or cap sections can be: eliminated or duplicated, connected or associated with its adjacent elements in a different manner, made integrally or separately.

There can also be different configurations and function of cap sections. For example: Compared to the basic version the end section and housing section can swap functions. The end section would assume the location and role of housing section and the housing section would assume the function and location of the end section while both sections maintain the same dimensions as described in the preferred basic embodiment. In the preferred basic embodiment the section nearest the truck cab is the largest and the other cap sections are smaller in succession. In the above example the smaller section would be near the truck cab and the other cap sections would be larger in succession. The convertible hard cap can have many various configurations, functions and amount of cap sections to obtain the claim(s) given.

The tracks or guides can have: other arrangements or placement and mode of function, various shapes, sizes and colors, or can be eliminated or duplicated, connected or associated with its adjacent elements, made of various rigid material, aluminum, fiberglass, metal, steel, etc, given a different mode or function, made integrally or separately. Base tracks can be; placed on the outside, inside, top or formed into the bed rail. All tracks or guides can have different guidance features, contraction and extension or raising and lowering accessories or devices, functions, anchorage or propulsion variations.

The cap door can have: other placement or mode of function, various shapes sizes, and color, or can: be eliminated or duplicated, connected or associated with its adjacent elements, made of various rigid material, aluminum, fiberglass, metal, steel, etc, given a different mode or function, made integrally or separately.

The ball locks or lock holes can have: other placements and mode of function, various shapes and sizes, or can be: eliminated or duplicated, connected or associated with its adjacent elements, made of various rigid material, aluminum, fiberglass, metal, steel, etc, given a different mode or function, made integrally or separately.

The track, door handle, scissor jack may be made from rigid material such as aluminum, steel etc. that is commercially available and that would support its function.

The convertible hard cap sections and track or guides and related elements can have other modes of movement and propulsion such as, manual and power motors, electric, fuel, hydraulic, robotics, electronics, etc. All elements of the convertible hard cap can be made with commercially available technology and material. The convertible hard cap can be applied in the post- market or incorporated into the pre-market manufacturing of new vehicles. Accordingly, the scope of the convertible hard cap invention should be determined not by the embodiment(s) illustrated, but by the appended claim(s) and their legal equivalents.

I claim:

1. A rigid convertible cap apparatus for an open bed vehicle or pick-up truck with the open bed having a width, a height and a length defined by longitudinally spaced apart forward and rearward ends, said apparatus comprising:

a plurality of movable independent rigid cap sections each having a laterally extending horizontal mid section and an end section extending downwardly from opposite lateral ends of the mid section, each end section having a plurality of guide elements attached to the lower edge thereof, the lower edge of each end section is capable of being flexed inwardly with respect to the open bed;

a pair of base tracks attached to opposite sides of the open bed and including a plurality of grooves corresponding to the plurality of cap sections; the plurality of guide elements on each of the plurality of cap sections being slidably received in respective ones of the plurality of grooves for selective movement to cover or uncover the open bed;

wherein the plurality of grooves are constructed so that each of the plurality of grooves extends inwardly and downwardly with respect to a forwardly adjacent one of the plurality of grooves from the rearward most groove to the groove directly adjacent to the groove for the forward most cap section of the plurality of cap sections; the guides of the forward most cap section being received in a housing section groove on the base tracks adjacent to the forward end of the open bed;

wherein the mid sections and end sections of the plurality of cap sections being constructed of the same dimensions whereby when the plurality of cap sections are extended to cover the open bed, they are in alignment vertically and horizontally to result in a smooth outer surface for the cap apparatus, and when the plurality of cap sections are retracted to uncover the open bed, the end sections thereof are flexed as they travel forwardly along the grooves of the base tracks so as to be overlapped and stored under the forward most cap section.

2. The cap apparatus according to claim 1 wherein the plurality of cap sections include the forward most cap section having a top cap seal, the rearward most cap section having a depressed cap groove and the middle cap sections have both top cap seals and depressed cap grooves whereby the top cap seals and depressed cap grooves engage each other to provide a weather seal for the cap apparatus when the cap apparatus is fully extended.

3. The cap apparatus according to claim 1 wherein the guide elements are ball guides.

* * * * *